(12) United States Patent
Chen et al.

(10) Patent No.: US 7,463,771 B2
(45) Date of Patent: Dec. 9, 2008

(54) METHOD FOR RETRIEVING ORIGINAL INTACT CHARACTERISTICS OF HEAVILY POLLUTED IMAGES AND ITS IMAGE PROCESSING

(75) Inventors: Chao-Lieh Chen, Tainan (TW); Chi-Chieh Chuang, Kaohsiung County (TW); Chun-Cheng Yang, Kaohsiung (TW)

(73) Assignee: Kun Shan University, Yung-Kang, Tainan Hsien (TW)

( * ) Notice: Subject to any disclaimer, the term of this patent is extended or adjusted under 35 U.S.C. 154(b) by 545 days.

(21) Appl. No.: 11/176,910

(22) Filed: Sep. 8, 2005

(65) Prior Publication Data
US 2007/0053588 A1    Mar. 8, 2007

(51) Int. Cl.
*G06K 9/00* (2006.01)
(52) U.S. Cl. .................... 382/170; 382/168; 382/169
(58) Field of Classification Search ............... 382/254, 382/168, 169, 170
See application file for complete search history.

(56) References Cited

OTHER PUBLICATIONS

HAF: an Adaptive Fuzzy Filter for Restoring Highly Corrupted Images by Histogram Estimation JH Wang, C Hsien-Chu—Proc. Natl. Sci. Counc. ROC (A), 1999 vol. 23, No. 5, pp. 630-643.*

Fuzzy partition of two-dimensional histogram and its application to thresholding HD Cheng, YH Chen —Pattern Recognition, 1999—Elsevier Pattern Recognition 32 (1999) 825-843.*

Survey over image thresholding techniques and quantitative performance evaluation Mehmet Sezgin, Bülent Sankur Journal of Electronic Imaging—Jan. 2004—vol. 13, Issue 1, pp. 146-168.*

* cited by examiner

*Primary Examiner*—Lewis West
*Assistant Examiner*—Li Liu

(57) ABSTRACT

A method for retrieving original intact characteristics of images heavily polluted by Gaussian impulse noises is based on the fuzzy automata theory retrieves the characteristics of images heavily corrupted by Gaussian impulse noises. The retrieved characteristics are represented with fuzzy sets, each of which is also called a fuzzy partition of the image histogram. The membership functions are used for noise filtering, multi-level thresholding, segmentation, and edge detection. This invention further utilizes the result images of filtering and thresholding to perform the second phase processing. After two-phase filtering, the signal-to-noise ratio SNR and the peak signal to noise ratio PSNR are increased up to 10 db for images polluted by noises higher than 50%. Having very low complexity of processing time and memory space, the kernel operation of the algorithm can be implemented with super-scalar super-pipelined 16-bit floating-point processing unit and achieve 24-bit true color results.

17 Claims, 12 Drawing Sheets

METHOD FOR RETRIEVING ORIGINAL INTACT CHARACTERISTICS OF HEAVILY POLLUTED IMAGES AND ITS IMAGE PROCESSING

FIELD OF THE INVENTION

Based on fuzzy automata theory, this invention describes a novel method that retrieves the original intact characteristics of images heavily polluted by Gaussian impulse noises. The characteristics are represented with fuzzy sets whose membership functions are used for noise removal, multi-level thresholding, segmentation, edge detection, and other image analysis operations. The image results after the first phase (Phase I) processing including noise removal and multi-level thresholding are used for further removal of corrupted spots and for further analyses, and these further operations are called the second phase (phase II) image processing. After the second phase processing, the result image becomes much clear according to not only the feeling of subjective eyesight but also the objective and evident increasing of SNR and PSNR values. At the same time, we obtain the images of multi-level thresholding, segmentation, and edge detection. These result images then contain enough useful information for analyses in fields such as medical diagnosis, image compression, image recognition, . . . , etc.

BACKGROUND OF THE INVENTION

Image is the most effective and most direct way to communicate. Nowadays, image transportation is widely and commonly applied in medicine, security, space, and many other sciences. However, due to much kind of possible defects of transportation media, communication channel, imaging facility, and/or failure of compression and storage, a clean image could be heavily corrupted by noises. Due to loss of much important information, the corrupted image is useless and loses its value in any industrial application. Before presenting the image to a user, we need to recover its information for analysis purposes such as multi-level thresholding, edge detection, and image segmentation. In image processing area, there are many filtering methods for noise removal such as low pass filters, median filter, weighted median filters (WM, Browrigg, 1984), center weighted median filter (CWM, Ko and Lee, 1991), and adaptive weighted fuzzy mean filters (AWFM, Kuo and Lee, 2000). Most of these methods apply only one-pass noise removal. After single pass noise removal, there are still large amount of corrupted spots in the image. For example, in sorting based filters, when the noise ratio is higher than 30%, being median gray level in the sample window, a noisy pixel is regarded as intact and will be filled back to the center of the sample window. Therefore, the median operation could further destroy the image by using many noisy pixels as operands. For the case in AWFM filters, the gray levels are partitioned into fixed three classes—Dark, Median, and Bright. The number of classes and distribution of gray levels in each class are fixed and are not adaptively obtained according to the characteristics of the corresponding image under processing. Thus, the result of WFM filters will be unacceptable when the gray levels of an image cannot be partitioned into three classes. This invention adaptively and automatically retrieves characteristics of each image under processing and clean up heavy noises by two-phase processing scheme. The second phase processing utilizes the result of the first phase to produces stable and the best result among the state-of-art filters.

In the field of image analysis, the primary processing operations are thresholding, segmentation, and edge detection. This invention not only filters out image noises but at the same time also performs the operations in these analyses. For highly polluted images such as those having noise ratio higher than 30%, there have not been methods to pursue thresholding, segmentation, and edge detection at low costs in both time and space complexity. Therefore, the invention does make a great advance in image analysis.

SUMMARY OF THE INVENTION

The invention primarily targets a noise filtering and analyses of thresholding, segmentation, and edge detection for heavily corrupted images by using a two-phase processing scheme. In addition to recovering clean image most close to the original and performing essential analyses, the processing time and the memory space costs are dramatically reduced compared with state-of-art methods.

The primary feature of this invention is to provide a two-phase image-processing algorithm. In the first phase the algorithm produces histogram of the corrupted image and according to the histogram automatically generate fuzzy partitions and their corresponding membership functions represented by LR parameters. The LR parameters representing an LR fuzzy set $(\alpha, m, \beta)_{LR}$ are the left spread $\alpha$, the mean m, and the right spread $\beta$. With the automatically generated fuzzy partitions and their corresponding membership functions, the algorithm filters the corrupted image and produces the Phase-I multi-level thresholded image. In the second phase processing, the algorithm re-samples the image results of the first phase. In the sample window, the algorithm compares the center pixel with its surrounding ones to determine whether the center pixel is corrupted and takes the median gray level of the intact pixels in the sample window as a new center pixel.

(c) Baboon image filtered with the MEDIAN Filters.

(d) Baboon image filtered with the WFM Filter.

(e) Baboon image filtered with the Phase I AMFG Filter.

(f) Baboon image filtered with the Phase II AMFG Filter.

Figure 7:
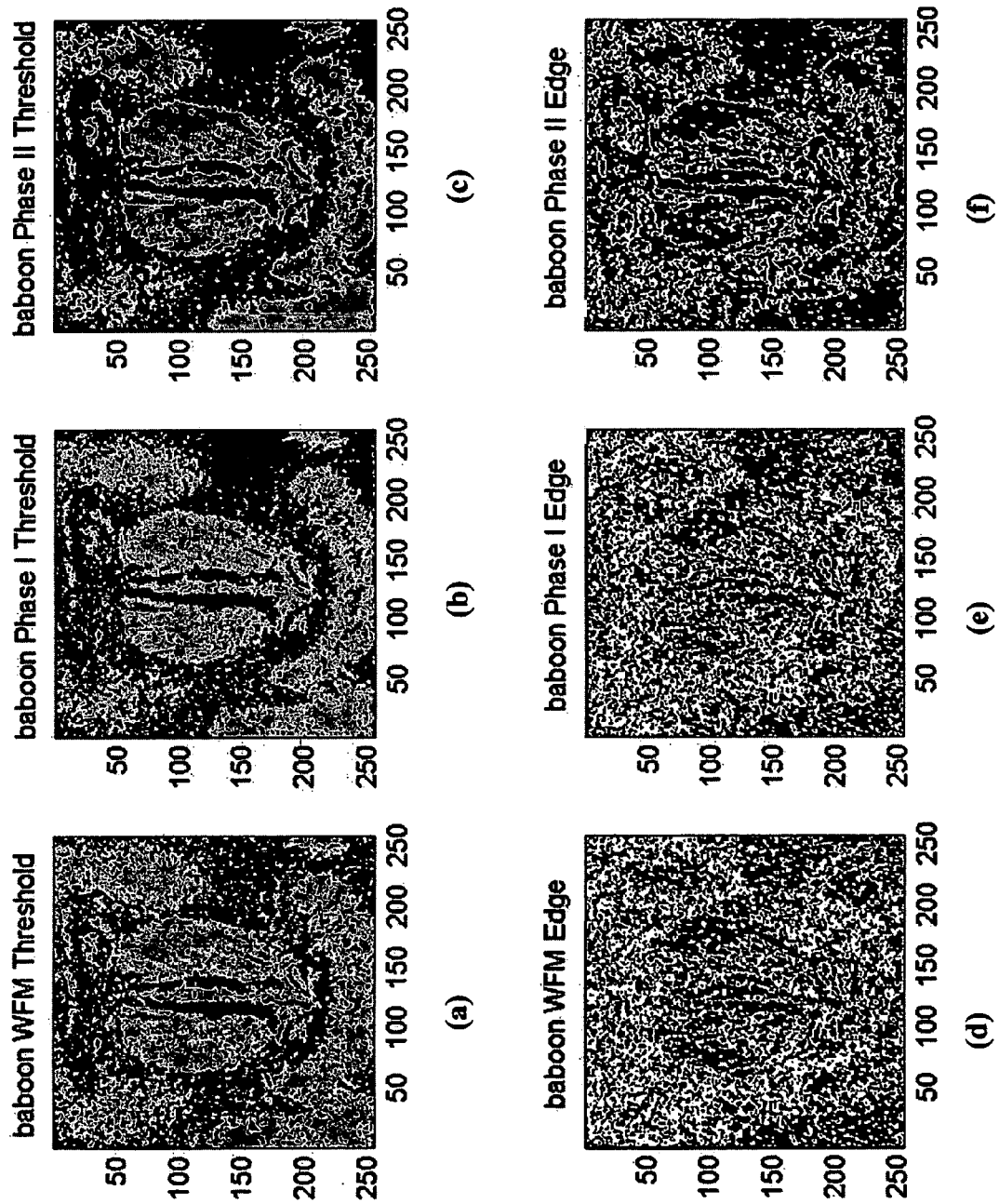

FIG. 7. shows a plurality drawings of the present invention, where (a) Baboon image thresholded after filtering of WFM Filter.

(b) Baboon image thresholded after filtering of Phase I AMFG Filter.

(c) Baboon image thresholded after filtering of Phase II AMFG Filter.

(d) Edge detection of the Baboon image after WFM Filter (e) Edge detection of the Baboon image after Phase I AMFG Filter.

(f) Edge detection of the Baboon image after Phase II AMFG Filter.

Figure 8:
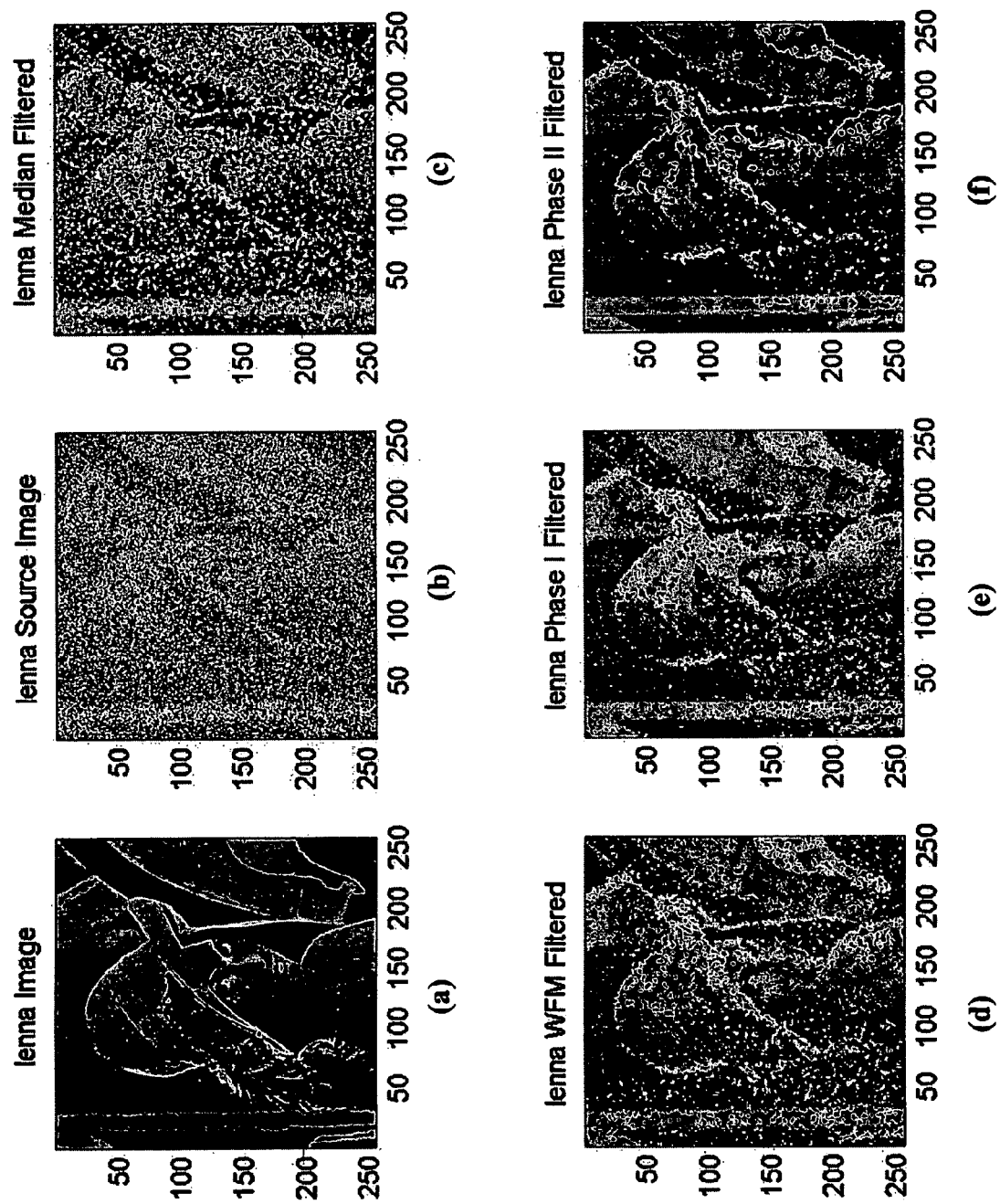

FIG. 8. shows a plurality drawings of the present invention, where (a) Lenna original image (b) Lenna image with additive 70% Gaussian impulse noise of mean length 150.

(c) Lenna image filtered with the MEDIAN Filters.

(d) Lenna image filtered with the WFM Filter.

(e) Lenna image filtered with the Phase I AMFG Filter.

(f) Lenna image filtered with the Phase II AMFG Filter.

Figure 9:
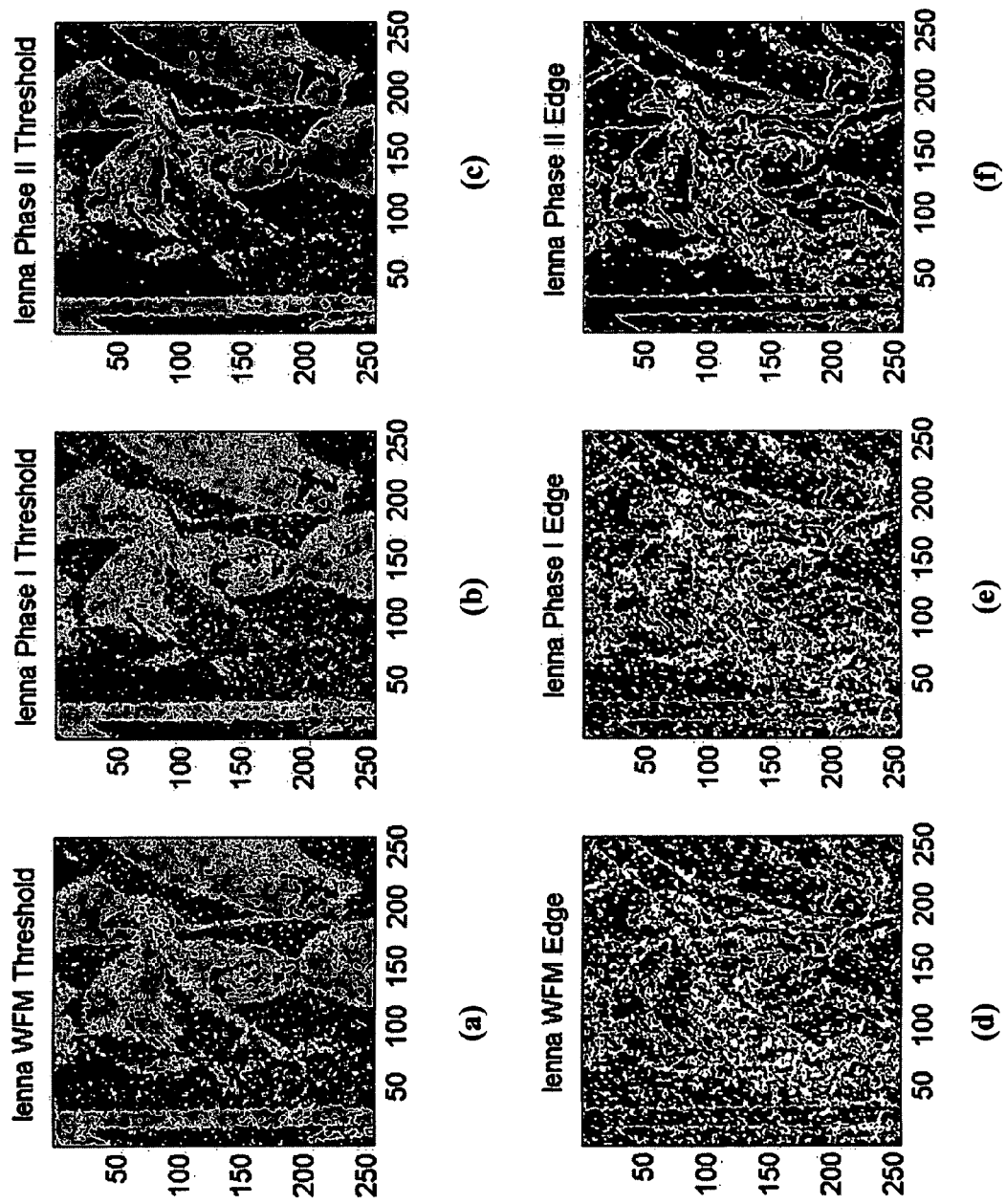

FIG. 9. shows a plurality drawings of the present invention, where (a) Lenna image thresholded after filtering of WFM Filter.

(b) Lenna image thresholded after filtering of Phase I AMFG Filter.

(c) Lenna image thresholded after filtering of Phase II AMFG Filter.

(d) Edge detection of the Lenna image after WFM Filter (e) Edge detection of the Lenna image after Phase I AMFG Filter.

(f) Edge detection of the Lenna image after Phase II AMFG Filter.

Figure 10:
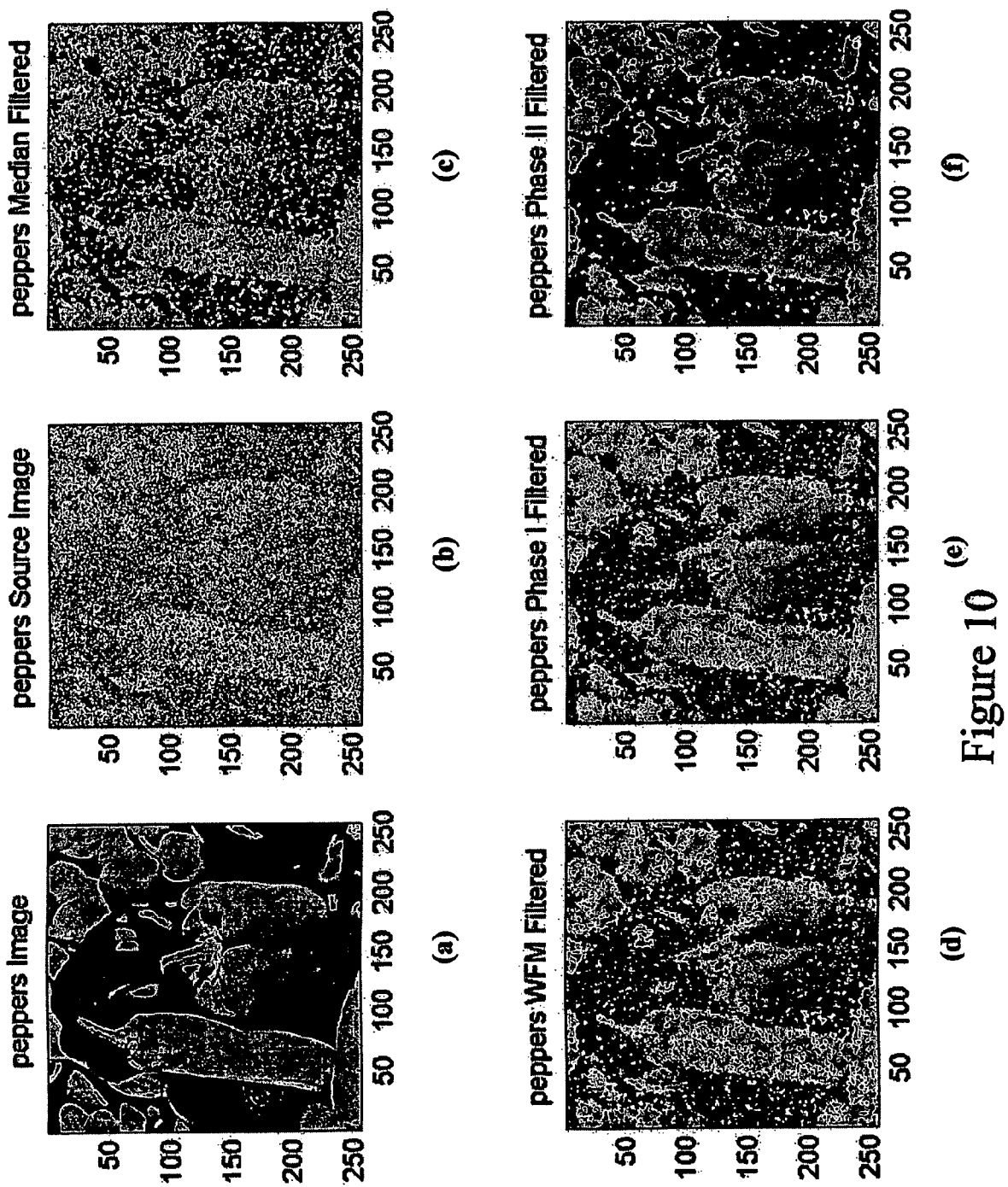

FIG. 10. shows a plurality drawings of the present invention, where (a) Peppers original image (b) Peppers image with additive 70% Gaussian impulse noise of mean length 150.

(c) Peppers image filtered with the MEDIAN Filters.

(d) Peppers image filtered with the WFM Filter.

(e) Peppers image filtered with the Phase I AMFG Filter.

(f) Peppers image filtered with the Phase II AMFG Filter.

Figure 11:
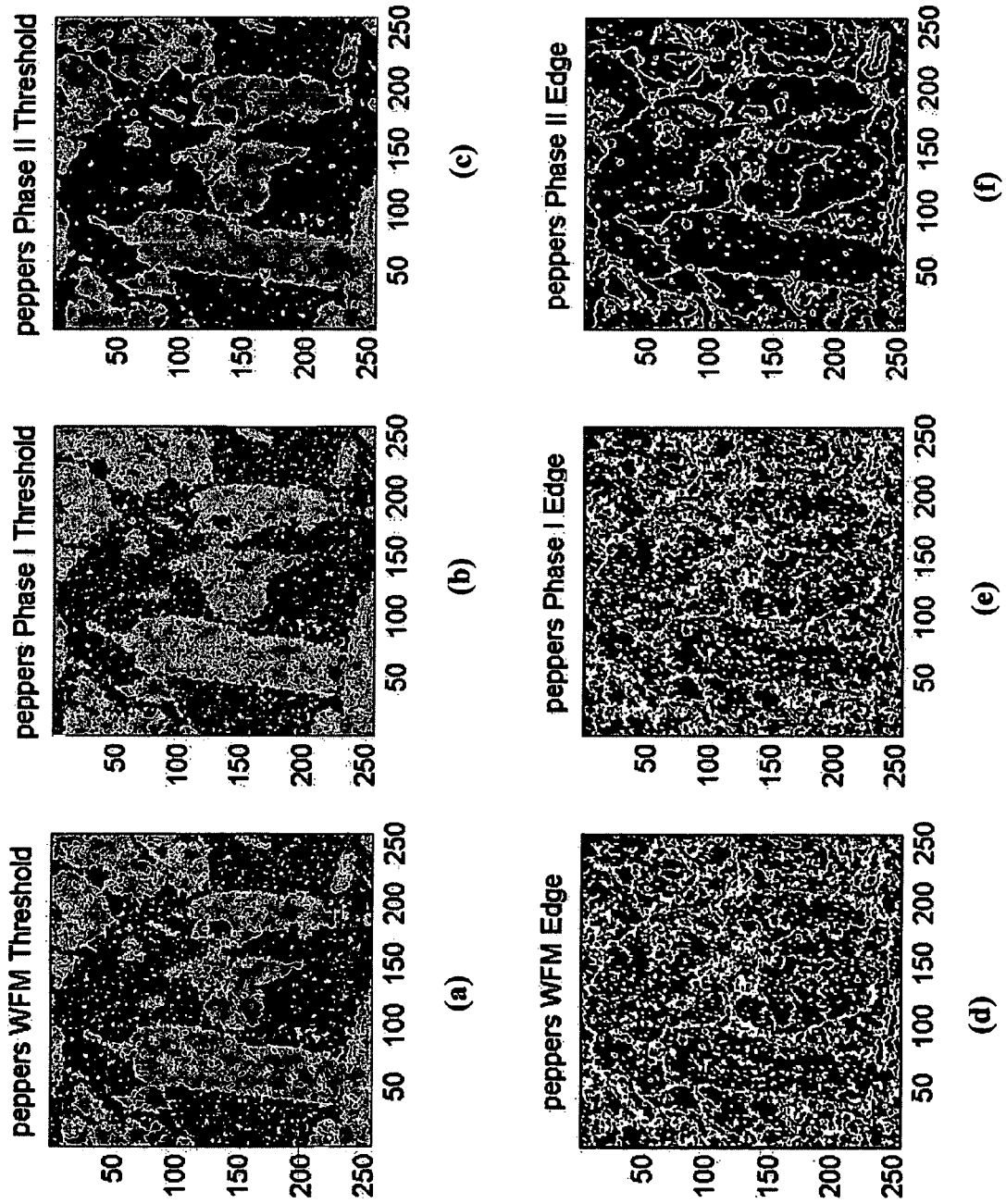

FIG. 11. shows a plurality drawings of the present invention, where (a) Peppers image thresholded after filtering of WFM Filter.

(b) Peppers image thresholded after filtering of Phase I AMFG Filter.

(c) Peppers image thresholded after filtering of Phase II AMFG Filter.

(d) Edge detection of the Peppers image after WFM Filter (e) Edge detection of the Peppers image after Phase I AMFG Filter.

(f) Edge detection of the Peppers image after Phase II AMFG Filter.

Figure 12:
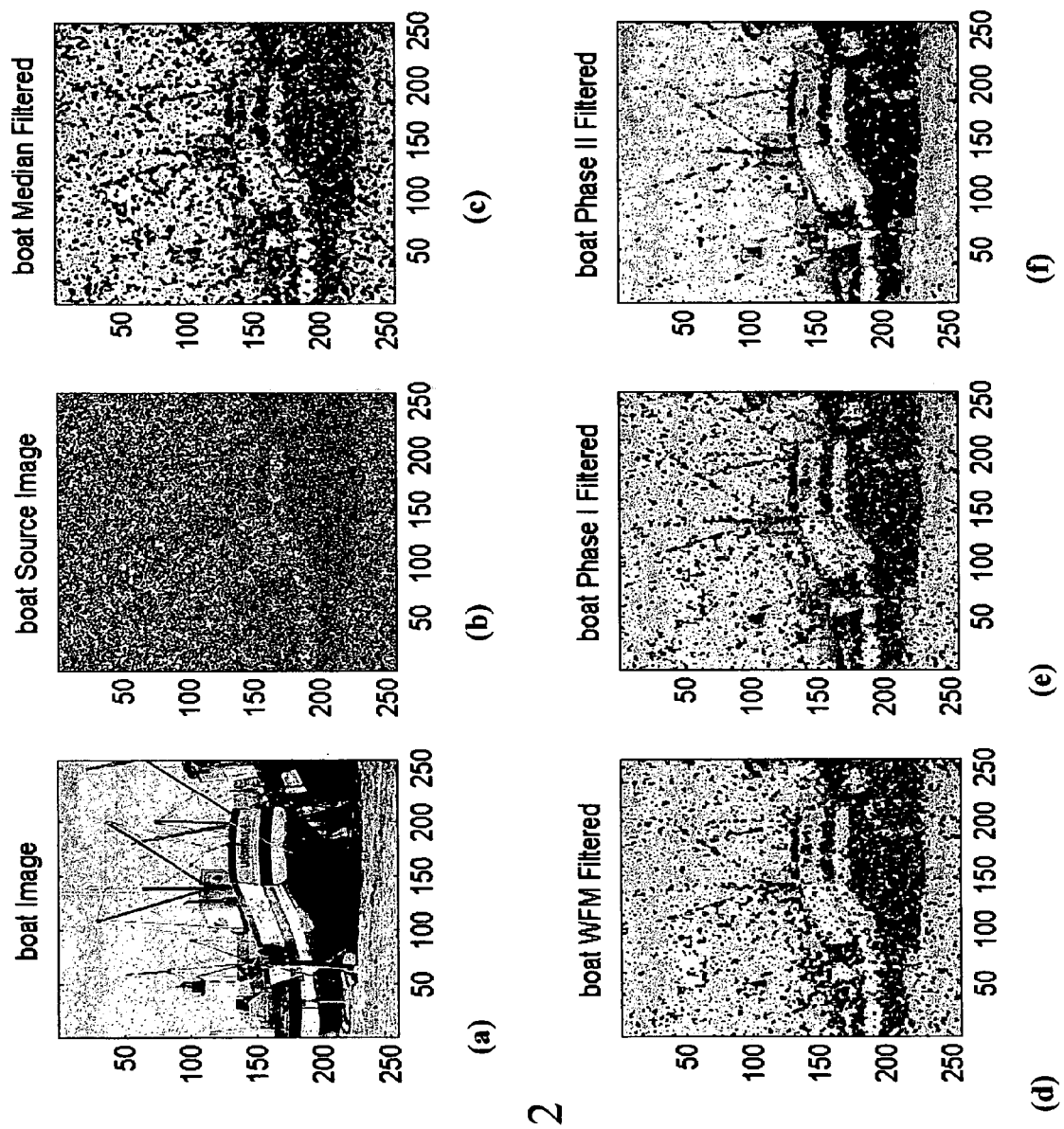

FIG. 12. shows a plurality drawings of the present invention, where (a) Boat original image (b) Boat image with additive 70% Gaussian impulse noise of mean length 150.

(c) Boat image filtered with the MEDIAN Filters.

(d) Boat image filtered with the WFM Filter.

(e) Boat image filtered with the Phase I AMFG Filter.

(f) Boat image filtered with the Phase II AMFG Filter.

Figure 13:
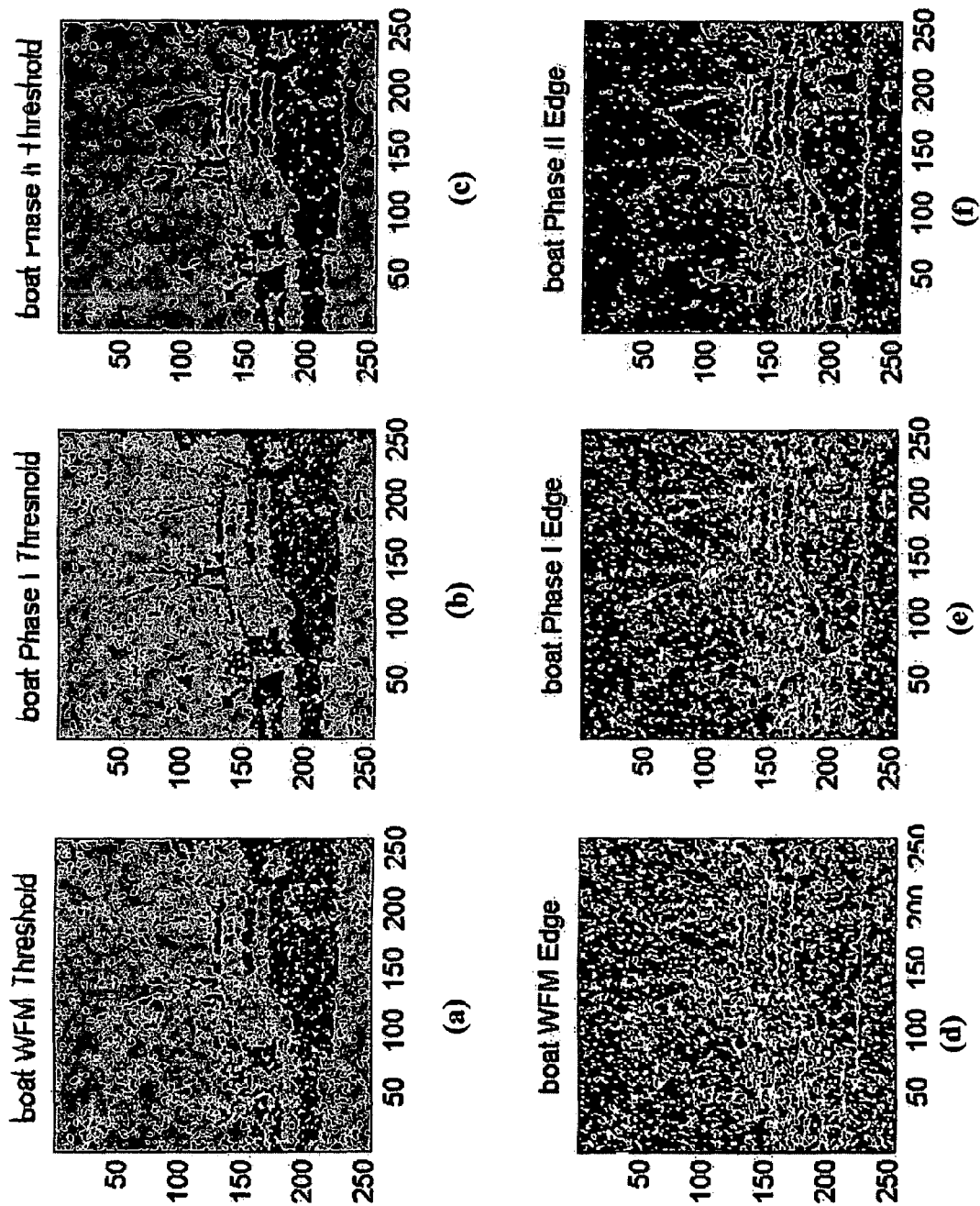

FIG. 13. shows a plurality drawings of the present invention, where (a) Boat image thresholded after filtering of WFM Filter.

(b) Boat image thresholded after filtering of Phase I AMFG Filter.

(c) Boat image thresholded after filtering of Phase II AMFG Filter.

(d) Edge detection of the Boat image after WFM Filter (e) Edge detection of the Boat image after Phase I AMFG Filter.

(f) Edge detection of the Boat image after Phase II AMFG Filter.

BRIEF DESCRIPTION OF THE INVENTION

To achieve the analysis and filtering purposes and performance mentioned above, we depict the proposed techniques by using the following illustrated examples with figures.

Figure 1:
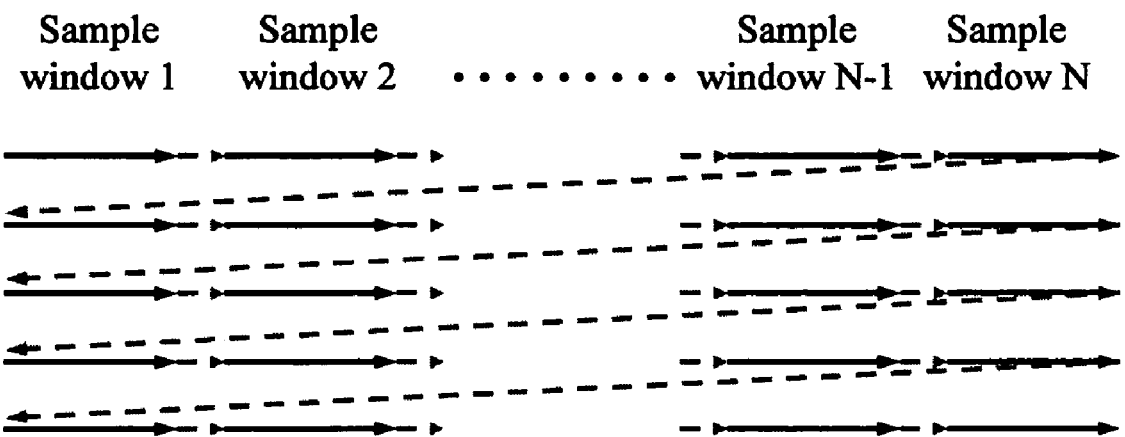
FIG. 1. Image sample window and its moving behavior when scanning pixels.

In the field of image processing, the filtering is similar to that in communication. Both of them in turns sample the input, perform operation, filtering or processing, and then output the result. Commonly used sampling mechanism in image processing is to use a two-dimensional sample window to sample the image pixels in one dimension first. Each time the sample window moves one pixel along the dimension. As FIG. 1, the sample window moves horizontally first to scan the image pixels. When the sample window reaches the end of the dimension, it moves vertically down one pixel along the other dimension and again starts the horizontal scanning. The iteration of this manner repeats until all pixels are scanned.

Figure 2:
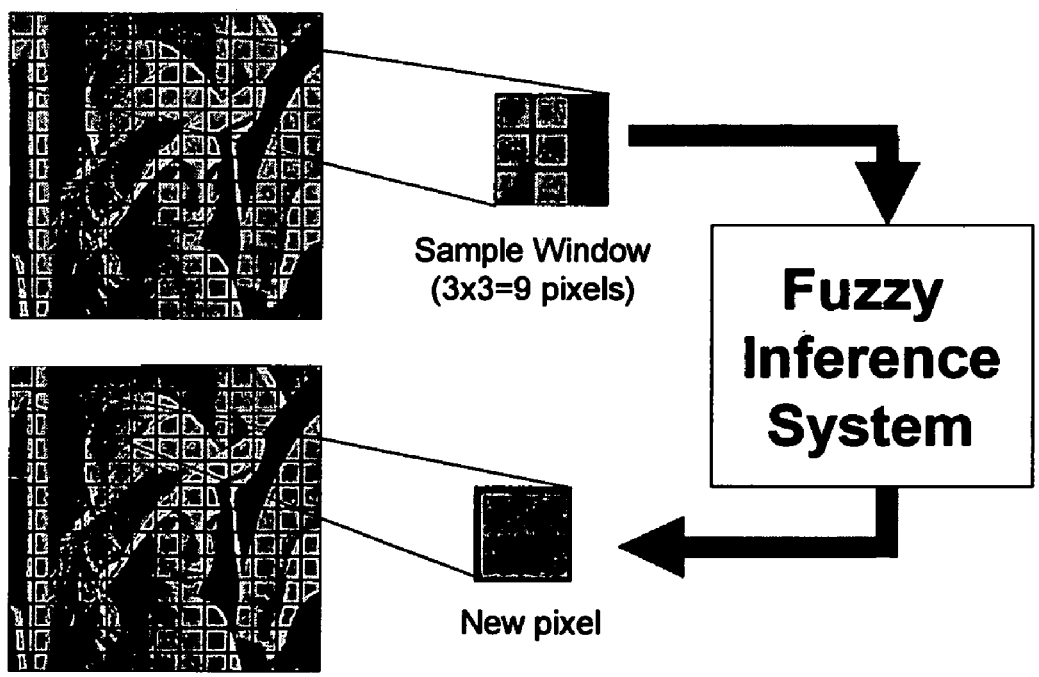
FIG. 2. The diagram showing the concept of using fuzzy inference for image processing.

This invention uses fuzzy inference for image processing as FIG. 2. The design specification and the algorithm determine the size of the sample window. The most commonly used sample window size is 3-by-3 (3×3). Adopting odd-by-odd sample window usually produce better results and among odd-by-odd sample windows, the 3-by-3 one is usually superior in filtering. This is because an image is a continuous two-dimensional signal with spatial locality. Thus, in a noise-free 3-by-3 sample window, the center pixel will have similar gray-level compared with surrounding pixels. The fuzzy inference system processes the pixels in the sample window and produces a new gray level to replace one of the pixels in the sample window. In the following description, we constantly replace the center pixel in the sample window.

This invention proposes the analyses of heavily corrupted images using fuzzy partitions in two-phases. We depict these two phases as follows:

1. Phase I

In the first phase filtering, according to the characteristics of the image under processing, the method automatically retrieves the parameters $\alpha$, m, and $\beta$ of the membership functions of the fuzzy partitions and then uses these membership functions to filter noises. The proposed filter is much superior to the sorting based filters and is also better than the weighted fuzzy mean filters, which adopt fixed membership functions. In addition, fuzzy partitions of the histogram also provide multi-level thresholds such that all gray levels in the same partition are assigned with a new representative gray level. That is, in addition to filtering, the Phase I multi-level thresholding is obtained at the same time.

Figure 3:
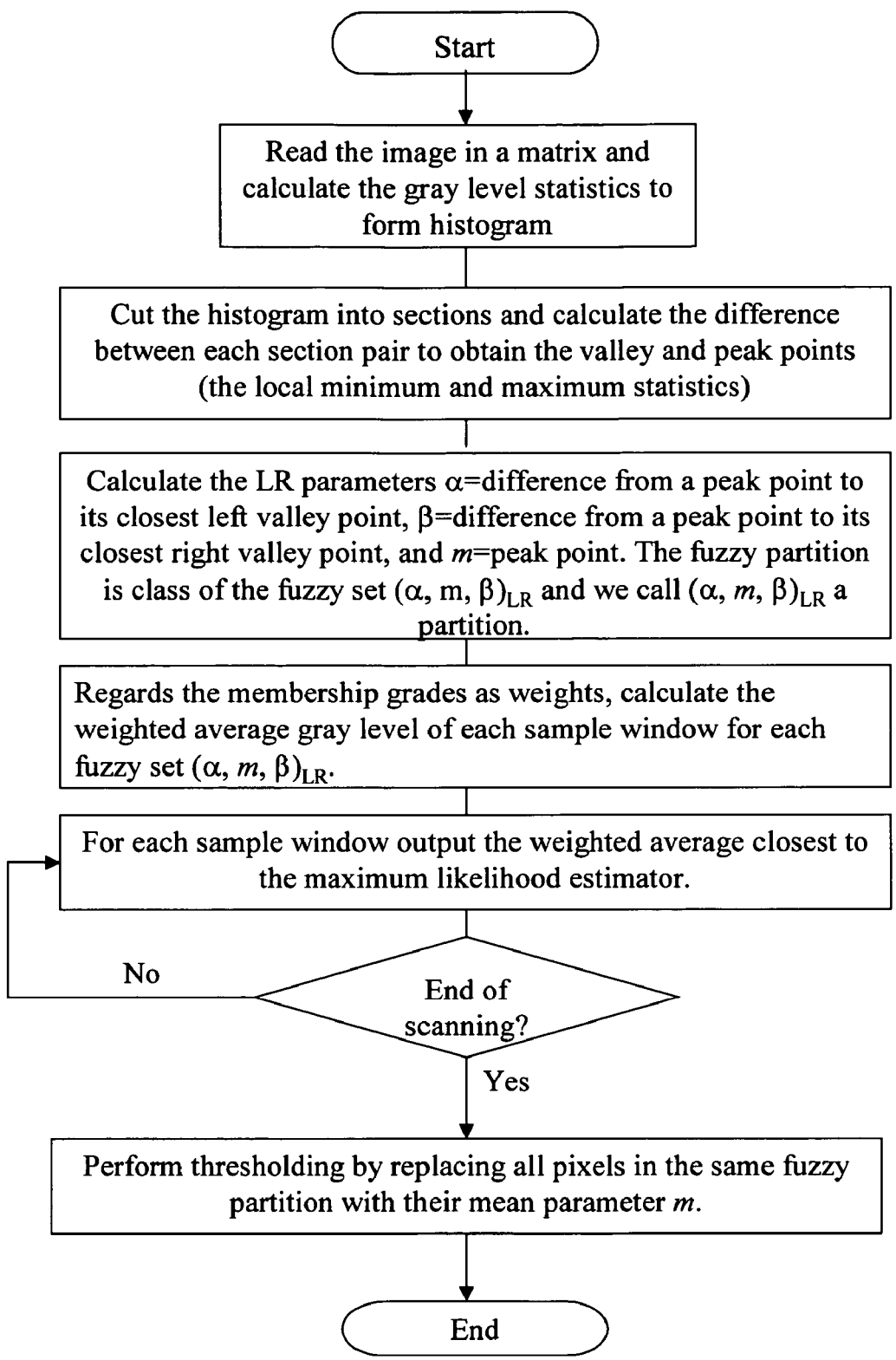
FIG. 3. The flowchart of Phase I image filtering and processing.

Please refer to FIG. 3 and the processing steps is as follows:

Step 1. Generate the Histogram and Partition the Histogram into Coarse Sections.

Read the N-by-N (N×N) image pixels into array XA(i, j). Accumulate the number of appearance of each gray level x as the histogram hs(x). Drop the statistics of x if x is outside the interval [5, L−5], where L is the largest gray level. In this way most impulse noisy pixels will not taken into account for membership function parameters calculations. The first x with nonzero statistic is the start point $hs_s$, of the histogram and the final x with nonzero statistic is the end point $hs_f$ of the histogram.

To find out the fuzzy partitions of hs(x), we perform down-sampling of the histogram as equations (1) and (2), where v is the sampling reference value, $c_n$ is the number of cut section, $c_p$ is the number of gray levels in each section.

$$c_n = ((v \times 2 + 1) + 2) \times 2 \tag{1}$$

$$c_p = \left\lfloor \frac{hs_f - hs_s}{c_n} \right\rfloor \tag{2}$$

In this way we down sample the histogram into $C_n$ levels.

Step 2. Find Out Local Minimum (Valley Point) and Local Maximum (Peak Point) of The Original Histogram.

Calculate the starting point $c_{hs}(i)$ of each section i in hs(x) and the average value $r_{hs}(i)$ as (3) and (4).

$$c_{hs}(i) = \left\lfloor \left( \frac{hs_f - hs_s}{c_n} \right) \times i \right\rfloor \tag{3}$$

$$r_{hs}(i) = \frac{\sum_{x=c_p(i-1)+1}^{c_p \times i} hs(x)}{c_p} \tag{4}$$

Calculate each difference $r_o(i)$ between every two consecutive sections as (5).

$$r_o(i) = r_{hs}(i+1) - r_{hs}(i) \tag{5}$$

Determine whether $c_{hs}(i)$ is a coarse valley point $c_m(i)$ as (6). Between two initial valley points $c_m(i)$ and $c_m(i-1)$ find the peak point $c_M(i)$ as (7).

$$\{c_m(k)|k \in N\} = \{c_{hs}(i)|r_o(i) > 0 \text{ and } r_o(i-1) < 0, i \in N - \{1\}\} \tag{6}$$

$$c_M(i) = \max_{x \in [c_m(i-1), c_m(i)-1]} hs(x) \tag{7}$$

Between two peak points $c_M(i)$ and $c_M(i-1)$, find the accurate valley point $c_m(i)$ as (8).

$$c_m(i) = \min_{x \in [c_M(i-1), c_M(i)-1]} hs(x) \tag{8}$$

Step 3. Calculate Parameters $\alpha_i$, $m_i$, and $\beta_i$ of each Fuzzy Partition i as (9), (10), and (11) and Obtain the Corresponding Membership Functions.

The left spread parameter:

$$\alpha_i = c_M(i) - c_m(i) \tag{9}$$

The mean parameter:

$$m_i = c_M(i) \tag{10}$$

The right spread:

$$\beta_i = c_m(i+1) - c_M(i) \tag{11}$$

We use the LR fuzzy set $(\alpha_i, m_i, \beta_i)_{LR}$ to represent fuzzy partition i. Use sample window YA of size $s_h \times s_w$ to sample XA. The (h, w)-th sample window is as (12).

$$YA(i,j) = XA(i,j)$$

$$i \in [h, h+(s_h-1)]$$

$$j \in [w, w+(s_w-1)] \tag{12}$$

Substitute YA(i, j) into membership function of the k-th fuzzy partition $(\alpha_k, m_k, \beta_k)_{LR}$ to obtain pixel YA(i,j)'s k-th membership grade $\mu_k(i,j)$ as (13).

$$\mu_k(i, j) = LR\left( \frac{m_k \ominus YA(i, j)}{\alpha_k} + \frac{YA(i, j) \ominus m_k}{\beta_k} \right), \tag{13}$$

where $a \ominus b = \max(a-b, 0)$ and LR(x) is the reference function such as $LR(x) = 1 \ominus x$.

Step 4. Calculate the Maximum Likelihood Estimator and the Weighted Mean.

Calculate the maximum likelihood estimator $AV_{hw}$ of pixels in sample window YA as (14). Summation of the multiplication of pixel YA(i, j) and weight $\mu_k(i, j)$ to obtain the weighted value $w_{k,ux}$ as (15). Divide $w_{k,ux}$ by $w_{k,u}$ as (16) and round the division to obtain the weighted mean $w_{k,am}$ as (17).

$$AV_{hw} = \frac{\sum_{i=1}^{s_w} \sum_{j=1}^{s_h} YA(i, j)}{s_h \times s_w} \tag{14}$$

$$w_{k,ux} = \sum_{i=1}^{s_w} \sum_{j=1}^{s_h} YA(i, j) \times \mu_k(i, j) \tag{15}$$

$$w_{k,u} = \sum_{i=1}^{s_w} \sum_{j=1}^{s_h} \mu_k(i, j) \tag{16}$$

$$w_{k,am} = \lfloor ((w_{k,ux} / w_{k,u}) + 0.5) \rfloor \tag{17}$$

Step 5. Output the Filtering Result and Obtain the Thresholding.

Calculate the difference between the k-th weighted mean $w_{k,am}$ and the maximum likelihood estimator $AV_{hw}$. Among $w_{k,am}$'s, find the one $w_{k,gm}$ closest to $AV_{hw}$ as (18). Assign OK(h, w) with $w_{k,gm}$. Repeat Step 4 and Step 5 until all N×N pixels in image XA are sampled and processed. That is when h=N and w=N the matrix OK is the resultant image of the first phase filtering.

$$w_{g,am} = \arg_{w_{k,am}} \left\{ \min_k |AV_{hw} - w_{k,am}| \right\} \tag{18}$$

Perform thresholding over OK(h, w) and obtain the thresholded image TH(h, w) as (19).

$$(\forall i \in N - \{1\}, c_m(i) \leq OK(h, w) < c_m(i+1))[TH(h, w) = c_M(i)] \tag{19}$$

Matrix TH is the Phase I thresholded image.

2. Phase II

Figure 4:
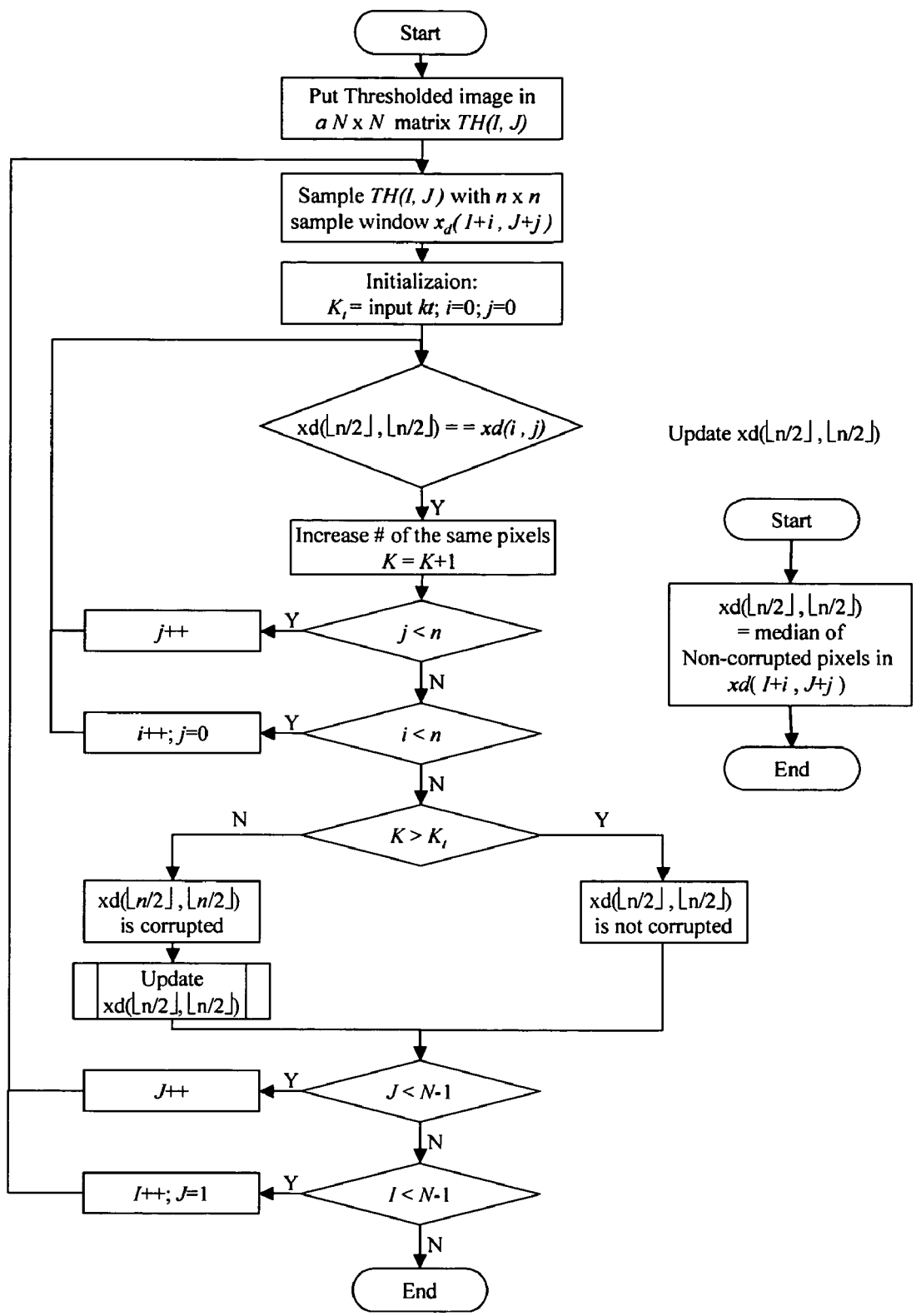
FIG. 4. The flowchart of Phase II image filtering and processing.

In the second phase processing, since the thresholded image TH from the first phase has much reduced gray level complexity, TH is used for judgment of whether a center pixel of a sample window is corrupted. When some surrounding pixels in the sample window have different gray level from the center pixel's, there are two expectances—the center pixel is either part of an edge segment or corrupted. In a sample window, the center pixel is compared with its surrounding ones. When the amount of pixels of the same gray level is less than a reference value Kt, it is regarded as part of a corrupted spot. The phase II algorithm replaces this pixel's gray level with the median of the non-corrupted ones in the sample window. Please refer to FIG. 4 and the detail steps is described as follows:

Step 1. Read the Thresholded Image in the First Phase into a Matrix TH of size N×N.

Step 2. Sample Matrix TH with a Sample Window xd of Size n×n, For Matrix OK, we Also Use an n×n Sample Window xo for Pixel Scanning.

The (I, J)-th sample window is as (20).

$$xd(i,j)=TH(i,j)$$

$$xo(i,j)=OK(i,j)$$

$$i \in [I, I+(n-1)]$$

$$j \in [J, J+(n-1)] \quad (20)$$

Step 3. Set the Reference Value Kt as Accumulating Threshold for Corruption Determination. Compare the Center Pixel of the Sample Window xd with the Surrounding Pixels One by One.

Let K has initial value 0.

For each comparison, if the gray level is the same, increase K.

Otherwise, K remains unchanged.

Step 4. Compare the Value of K with Kt.

If K>Kt, the center pixel remain unchanged and we go back to Step 2 to move the two sample windows to the next position. Otherwise, the center pixel is regarded corrupted and proceed to Step 5 and Step 6.

Step 5. Find the Median Value of Uncorrupted Pixels in Sample Window xo.

Since now the center pixel is regarded as corrupted, in the sample window xd, the pixels different from the center $xd(I+\lceil n/2 \rceil, J+\lceil n/2 \rceil)$ are regarded uncorrupted and only their corresponding pixels in xo can join the median calculation. We replace the corrupted center pixel with the median gray level of xo.

Step 6. Replace the Center Pixel $xo(I+\lceil n/2 \rceil, J+\lceil n/2 \rceil)$ with the Median Obtained in Step 5.

When the sample window moves to the final position, that is, I=N and J=N. The matrix OK is updated and the second phase filtering is end.

Step 7. Obtain the New Thresholded Image TH from OK as Previously Described in (19).

Step 8. Detect the Edge and Obtain the Edge Image Ed.

As (21), when the sample window xd of matrix TH has pixels of more than two gray levels, the center pixel is regarded a part of an edge.

$$(\forall I,J \leq N)(\forall i,j \leq n)(xd(I+\lceil n/2 \rceil, J+\lceil n/2 \rceil) \neq xd(I+i, J+j))$$
$$[ED(I,J)]=255 \quad (21)$$

Figure 5:
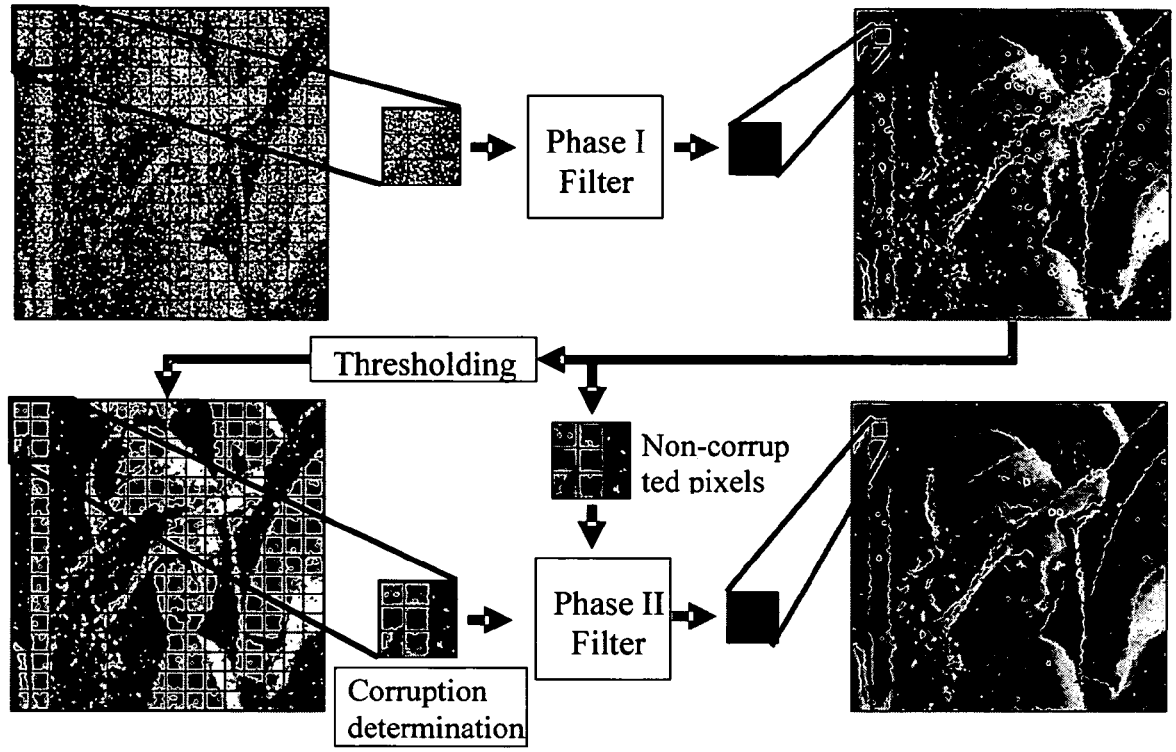
FIG. 5. The diagram of the two-phase image processing of this invention.
Figure 6:
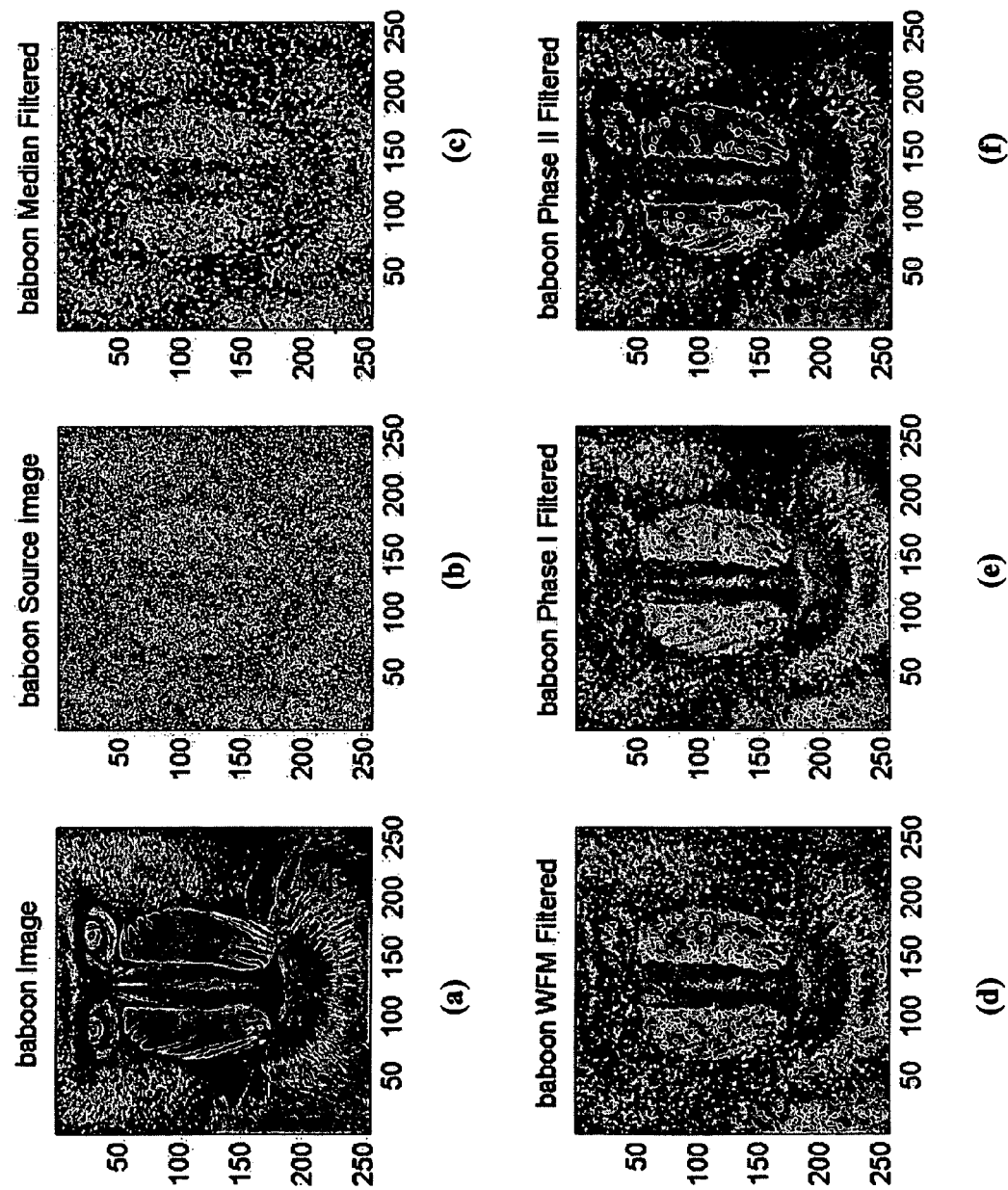
FIG. 6. shows the processing of the present invention, wherein (a) Baboon original image (b) Baboon image with additive 70% Gaussian impulse noise of mean length 150.

The above two-phase filtering is shown as FIG. 5. We call the proposed filter the automatic membership function generation (AMFG) filter. The AMFG filter adaptively generate fuzzy partitions according to the characteristics of the image under processing and hence has better noise removal ability than fuzzy mean filters even though they both use fuzzy weighted mean for filtering. Moreover, in Phase II, the AMFG Filter further removes corrupted spots left in the resultant image of Phase I. The removal utilizes the two results including filtered and thresholded images from Phase I. The operations use only non-corrupted pixels and thus the probability that noises participate in the calculation is very low. From the experiments as shown in FIG. 6 to FIG. 13 and according to the following tables comparing SNR and PSNR values, AMFG filter is superior to both WFM and sorting-based filters. The distribution of Gaussian impulse noise in these tables is represented as $N(\mu, \sigma)$ where $\mu$ is the mean and $\sigma^2$ is the variance of the distribution. That is when we regard the Gaussian impulse noises as two sources—Gaussian and impulse noises, the impulse noise length is $\pm \mu$ and the white Gaussian noise is distributed with zero mean and variance $\sigma^2$.

TABLE 1

SNR comparisons of Baboon image with Gaussian impulse noise N(100, 1)

| Baboon100 | 10% | 20% | 30% | 40% | 50% | 60% | 70% | 80% | 90% | 100% |
|---|---|---|---|---|---|---|---|---|---|---|
| Source Image | 12.975 | 10.0727 | 8.2699 | 7.0757 | 6.0696 | 5.2769 | 4.6151 | 4.0348 | 3.5264 | 3.067 |
| Median Filtered | 18.1087 | 17.4394 | 16.02 | 14.2473 | 12.0812 | 10.0857 | 8.1744 | 6.5362 | 5.1474 | 3.9777 |
| WFM Filtered | 16.9384 | 16.1784 | 15.2772 | 14.3058 | 13.4519 | 12.3866 | 10.9994 | 8.3095 | 5.6781 | 3.1844 |
| Phase I Filtered | 16.441 | 15.6664 | 14.6333 | 14.4744 | 13.6627 | 12.6289 | 11.1135 | 8.7646 | 5.8662 | 4.4397 |
| Phase II Filtered | 16.5153 | 15.8941 | 15.1072 | 15.6946 | 15.3717 | 14.7763 | 13.6184 | 10.7106 | 6.3366 | 4.5263 |
| Phase III Filtered | 16.3854 | 15.8138 | 15.0586 | 15.6915 | 15.4878 | 15.0931 | 14.1858 | 11.4022 | 6.5224 | 4.5538 |

TABLE 2

SNR comparisons of Baboon image with Gaussian impulse noise N(150, 1)

| Baboon150 | 10% | 20% | 30% | 40% | 50% | 60% | 70% | 80% | 90% | 100% |
|---|---|---|---|---|---|---|---|---|---|---|
| Source Image | 10.8244 | 7.768 | 5.9896 | 4.7329 | 3.7774 | 2.9929 | 2.2834 | 1.7313 | 1.2292 | 0.7659 |
| Median Filtered | 18.0166 | 16.9213 | 15.0657 | 12.5092 | 9.919 | 7.5337 | 5.3065 | 3.6388 | 2.2452 | 1.0347 |
| WFM Filtered | 17.5799 | 16.9728 | 16.0106 | 14.6819 | 13.0505 | 11.3619 | 8.9688 | 6.4711 | 3.4843 | 0.3572 |

TABLE 2-continued

SNR comparisons of Baboon image with Gaussian impulse noise N(150, 1)

| Baboon150 | 10% | 20% | 30% | 40% | 50% | 60% | 70% | 80% | 90% | 100% |
|---|---|---|---|---|---|---|---|---|---|---|
| Phase I Filtered | 16.533 | 15.9187 | 14.8974 | 14.0902 | 12.7487 | 11.157 | 9.4444 | 6.4916 | 3.5728 | 3.078 |
| Phase II Filtered | 16.6718 | 16.2471 | 15.6855 | 15.6911 | 15.0578 | 14.2947 | 12.6084 | 8.9438 | 4.3779 | 3.2899 |
| Phase III Filtered | 16.5768 | 16.2 | 15.657 | 15.7529 | 15.3631 | 14.832 | 13.5121 | 9.9552 | 4.7145 | 3.3234 |

TABLE 3

SNR comparisons of Lenna image with Gaussian impulse noise N(100, 1)

| Lenna100 | 10% | 20% | 30% | 40% | 50% | 60% | 70% | 80% | 90% | 100% |
|---|---|---|---|---|---|---|---|---|---|---|
| Source Image | 12.7738 | 9.8454 | 8.1084 | 6.8865 | 5.9126 | 5.1209 | 4.4449 | 3.8921 | 3.3693 | 2.9216 |
| Median Filtered | 23.0554 | 21.0961 | 18.553 | 15.3751 | 12.5733 | 9.9956 | 7.8829 | 6.1276 | 4.6346 | 3.4728 |
| WFM Filtered | 20.1453 | 18.8165 | 17.5187 | 16.0191 | 14.7736 | 13.1493 | 11.4134 | 9.0531 | 6.0836 | 2.9105 |
| Phase I Filtered | 20.7353 | 19.751 | 18.5224 | 16.9775 | 15.5831 | 13.7298 | 11.7393 | 8.0751 | 6.2016 | 0.8327 |
| Phase II Filtered | 20.2974 | 19.7845 | 19.341 | 18.8275 | 17.9098 | 16.7958 | 14.8107 | 9.8009 | 7.0708 | 0.9592 |
| Phase III Filtered | 20.0214 | 19.4985 | 19.1255 | 18.7766 | 18.0418 | 17.3174 | 15.6446 | 10.4166 | 7.4849 | 0.9899 |

TABLE 4

SNR comparisons of Lenna image with Gaussian impulse noise N(150, 1)

| Lenna150 | 10% | 20% | 30% | 40% | 50% | 60% | 70% | 80% | 90% | 100% |
|---|---|---|---|---|---|---|---|---|---|---|
| Source Image | 10.4628 | 7.4211 | 5.6981 | 4.4827 | 3.5464 | 2.7434 | 2.0715 | 1.4676 | 0.9646 | 0.5199 |
| Median Filtered | 22.4472 | 20.0665 | 16.4491 | 13.3095 | 10.2374 | 7.4684 | 5.2682 | 3.3371 | 1.915 | 0.7521 |
| WFM Filtered | 20.3724 | 18.8613 | 17.0277 | 15.4704 | 13.7193 | 11.4278 | 8.9774 | 6.0738 | 2.959 | 0.6548 |
| Phase I Filtered | 20.2181 | 18.9669 | 17.2263 | 15.6029 | 13.7321 | 11.7205 | 9.1009 | 6.0836 | 0.0019 | 0 |
| Phase II Filtered | 19.9616 | 19.1947 | 18.6209 | 18.0375 | 16.9158 | 15.3521 | 12.3493 | 8.6377 | 0.0001 | −0.0001 |
| Phase III Filtered | 19.7374 | 18.956 | 18.6085 | 18.174 | 17.4214 | 16.1191 | 13.348 | 9.7365 | 0.0001 | −0.0001 |

TABLE 5

SNR comparisons of Pepper image with Gaussian impulse noise N(100, 1)

| peppers100 | 10% | 20% | 30% | 40% | 50% | 60% | 70% | 80% | 90% | 100% |
|---|---|---|---|---|---|---|---|---|---|---|
| Source Image | 12.9438 | 10.0034 | 8.2382 | 6.9488 | 6.0112 | 5.2064 | 4.5462 | 3.9724 | 3.4736 | 3.0067 |
| Median Filtered | 24.0664 | 21.5265 | 18.8431 | 15.529 | 12.6623 | 10.0499 | 7.9544 | 6.1696 | 4.7212 | 3.5189 |
| WFM Filtered | 21.0013 | 19.6803 | 18.498 | 16.7943 | 15.2045 | 13.4744 | 11.599 | 9.1467 | 6.2311 | 2.9955 |
| Phase I Filtered | 17.4986 | 19.9714 | 18.6179 | 13.2332 | 15.2856 | 11.8912 | 11.2605 | 9.0722 | 6.2196 | 3.1031 |
| Phase II Filtered | 17.988 | 19.8917 | 19.1558 | 14.0177 | 17.5211 | 13.4005 | 13.5415 | 11.4211 | 6.9028 | 3.1005 |
| Phase III Filtered | 18.0673 | 19.5867 | 18.9685 | 14.1328 | 17.7265 | 13.6984 | 14.0165 | 12.4223 | 7.1967 | 3.1059 |

TABLE 6

SNR comparisons of Pepper image with Gaussian impulse noise N(150, 1)

| peppers150 | 10% | 20% | 30% | 40% | 50% | 60% | 70% | 80% | 90% | 100% |
|---|---|---|---|---|---|---|---|---|---|---|
| Source Image | 10.5023 | 7.5439 | 5.7997 | 4.5544 | 3.6344 | 2.7545 | 2.146 | 1.5176 | 1.0333 | 0.5724 |
| Median Filtered | 23.3079 | 20.5331 | 17.0017 | 13.3635 | 10.3423 | 7.3407 | 5.4003 | 3.4215 | 2.03 | 0.8134 |
| WFM Filtered | 21.1766 | 19.7254 | 17.6346 | 15.444 | 13.3504 | 10.6133 | 8.7324 | 4.1155 | 2.6608 | −0.1175 |
| Phase I Filtered | 20.6664 | 12.9899 | 17.3114 | 10.8172 | 13.3292 | 10.5972 | 8.7219 | 5.8571 | 2.9736 | −0.3347 |
| Phase II Filtered | 20.1187 | 13.492 | 18.8707 | 12.1188 | 16.9852 | 14.4236 | 12.3534 | 8.1697 | 3.7543 | −0.3553 |
| Phase III Filtered | 19.7929 | 13.533 | 18.7827 | 12.281 | 17.5308 | 15.5836 | 13.7786 | 9.224 | 4.1097 | −0.3545 |

TABLE 7

SNR comparisons of Boat image with Gaussian impulse noise N(100, 1)

| boat100 | 10% | 20% | 30% | 40% | 50% | 60% | 70% | 80% | 90% | 100% |
|---|---|---|---|---|---|---|---|---|---|---|
| Source Image | 14.0246 | 11.0775 | 9.2924 | 8.0422 | 7.1127 | 6.3088 | 5.6149 | 5.0504 | 4.5253 | 4.0722 |
| Median Filtered | 20.9373 | 19.6684 | 17.8279 | 15.5728 | 13.33 | 10.9758 | 8.9781 | 7.3076 | 5.8568 | 4.6913 |
| WFM Filtered | 19.0911 | 18.2913 | 17.3357 | 16.4812 | 12.5724 | 12.9488 | 11.7269 | 9.8422 | 7.1108 | 4.3928 |
| Phase I Filtered | 19.1426 | 18.2104 | 17.4986 | 16.2999 | 15.0153 | 13.5299 | 11.8167 | 9.7533 | 7.1591 | 4.0939 |
| Phase II Filtered | 18.6621 | 18.0138 | 17.7345 | 17.0894 | 16.3519 | 15.2701 | 13.728 | 11.2164 | 7.6578 | 4.046 |
| Phase III Filtered | 18.2269 | 17.7008 | 17.4702 | 16.9446 | 16.3657 | 15.5164 | 14.1773 | 11.8487 | 7.8542 | 4.0377 |

TABLE 8

SNR comparisons of Boat image with Gaussian impulse noise N(150, 1)

| boat150 | 10% | 20% | 30% | 40% | 50% | 60% | 70% | 80% | 90% | 100% |
|---|---|---|---|---|---|---|---|---|---|---|
| Source Image | 11.585 | 8.5414 | 6.8766 | 5.6137 | 4.5991 | 3.8314 | 3.1981 | 2.6063 | 2.0628 | 1.639 |
| Median Filtered | 20.65 | 18.7815 | 16.5899 | 13.7566 | 10.8475 | 8.3562 | 6.3518 | 4.536 | 3.0001 | 1.9455 |
| WFM Filtered | 9.4359 | 8.9687 | 16.7299 | 15.1802 | 13.2572 | 11.3381 | 9.2217 | 6.5049 | 3.4561 | 0.6624 |
| Phase I Filtered | 18.9864 | 16.7837 | 15.1843 | 13.7756 | 12.5597 | 11.511 | 10.7019 | 8.9552 | 8.2656 | 6.7594 |
| Phase II Filtered | 18.6295 | 17.0105 | 15.4449 | 14.0047 | 12.7847 | 11.7693 | 10.9927 | 8.9546 | 8.3607 | 6.7828 |
| Phase III Filtered | 18.2229 | 16.972 | 15.4704 | 14.0772 | 12.8166 | 11.7831 | 10.9909 | 8.9546 | 8.3006 | 6.7881 |

TABLE 9

SNR comparisons of Baboon image with Gaussian impulse noise N(100, 1)

| Baboon100 | 10% | 20% | 30% | 40% | 50% | 60% | 70% | 80% | 90% | 100% |
|---|---|---|---|---|---|---|---|---|---|---|
| Source Image | 18.4758 | 15.5736 | 13.7707 | 12.5765 | 11.5704 | 10.7777 | 10.116 | 9.5356 | 9.0272 | 8.5678 |
| Median Filtered | 23.6095 | 22.9403 | 21.5209 | 19.7481 | 17.5821 | 15.5866 | 13.6753 | 12.037 | 10.6483 | 9.4785 |
| WFM Filtered | 22.4393 | 21.6793 | 20.778 | 19.8066 | 18.9528 | 17.8874 | 16.5002 | 13.8104 | 11.1789 | 8.6852 |
| Phase I Filtered | 21.9419 | 21.1672 | 20.1341 | 19.9752 | 19.1635 | 18.1297 | 16.6143 | 14.2655 | 11.367 | 9.9405 |
| Phase II Filtered | 22.0161 | 21.3949 | 20.6081 | 21.1954 | 20.8725 | 20.2771 | 19.1193 | 16.2114 | 11.8374 | 10.0271 |

TABLE 9-continued

SNR comparisons of Baboon image with Gaussian impulse noise N(100, 1)

| Baboon100 | 10% | 20% | 30% | 40% | 50% | 60% | 70% | 80% | 90% | 100% |
|---|---|---|---|---|---|---|---|---|---|---|
| Phase III Filtered | 21.8863 | 21.3147 | 20.5594 | 21.1924 | 20.9886 | 20.594 | 19.6867 | 16.9031 | 12.0233 | 10.0546 |

TABLE 10

SNR comparisons of Baboon image with Gaussian impulse noise N(150, 1)

| Baboon150 | 10% | 20% | 30% | 40% | 50% | 60% | 70% | 80% | 90% | 100% |
|---|---|---|---|---|---|---|---|---|---|---|
| Source Image | 16.3252 | 13.2688 | 11.4904 | 10.2338 | 9.2782 | 8.4937 | 7.7843 | 7.2322 | 6.73 | 6.2668 |
| Median Filtered | 23.5175 | 22.4221 | 20.5665 | 18.0101 | 15.4198 | 13.0346 | 10.8073 | 9.1397 | 7.746 | 6.5356 |
| WFM Filtered | 23.0807 | 22.4737 | 21.5114 | 20.1828 | 18.5514 | 16.8628 | 14.4697 | 11.972 | 8.9851 | 5.858 |
| Phase I Filtered | 22.0338 | 21.4196 | 20.3983 | 19.591 | 18.2496 | 16.6579 | 14.9453 | 11.9925 | 9.0737 | 8.5788 |
| Phase II Filtered | 22.1727 | 21.7479 | 21.1863 | 21.1919 | 20.5587 | 19.7956 | 18.1092 | 14.4447 | 9.8787 | 8.7907 |
| Phase III Filtered | 22.0776 | 21.7009 | 21.1578 | 21.2538 | 20.8639 | 20.3329 | 19.013 | 15.456 | 10.2153 | 8.8242 |

TABLE 11

PSNR comparisons of Lenna image with Gaussian impulse noise N(100, 1)

| Lenna100 | 10% | 20% | 30% | 40% | 50% | 60% | 70% | 80% | 90% | 100% |
|---|---|---|---|---|---|---|---|---|---|---|
| Source Image | 18.6353 | 15.7069 | 13.9699 | 12.7481 | 11.7741 | 10.9825 | 10.3064 | 9.7536 | 9.2309 | 8.7831 |
| Median Filtered | 28.9169 | 26.9576 | 24.4145 | 21.2366 | 18.4348 | 15.8571 | 13.7444 | 11.9891 | 10.4961 | 9.3344 |
| WFM Filtered | 26.0068 | 24.6781 | 23.3802 | 21.8806 | 20.6351 | 19.0108 | 17.2749 | 14.9147 | 11.9451 | 8.772 |
| Phase I Filtered | 26.5968 | 25.6125 | 24.3839 | 22.8391 | 21.4447 | 19.5914 | 17.6008 | 13.9367 | 12.0631 | 6.6943 |
| Phase II Filtered | 26.159 | 25.646 | 25.2025 | 24.689 | 23.7713 | 22.6573 | 20.6722 | 15.6624 | 12.9323 | 6.8207 |
| Phase III Filtered | 25.883 | 25.36 | 24.9871 | 24.6381 | 23.9034 | 23.1789 | 21.5062 | 16.2781 | 13.3465 | 6.8514 |

TABLE 12

PSNR comparisons of Lenna image with Gaussian impulse noise N(150, 1)

| Lenna150 | 10% | 20% | 30% | 40% | 50% | 60% | 70% | 80% | 90% | 100% |
|---|---|---|---|---|---|---|---|---|---|---|
| Source Image | 16.3243 | 13.2826 | 11.5596 | 10.3442 | 9.408 | 8.6049 | 7.9331 | 7.3291 | 6.8262 | 6.3814 |
| Median Filtered | 28.3087 | 25.9281 | 22.3106 | 19.1711 | 16.099 | 13.33 | 11.1298 | 9.1986 | 7.7765 | 6.6136 |
| WFM Filtered | 26.2339 | 24.7228 | 22.8892 | 21.3319 | 19.5809 | 17.2894 | 14.8389 | 11.9354 | 8.8205 | 6.5164 |
| Phase I Filtered | 26.0796 | 24.8285 | 23.0879 | 21.4645 | 19.5936 | 17.5821 | 14.9624 | 11.9451 | 5.8635 | 5.8615 |
| Phase II Filtered | 25.8232 | 25.0562 | 24.4824 | 23.899 | 22.7773 | 21.2136 | 18.2108 | 14.4993 | 5.8616 | 5.8615 |
| Phase III Filtered | 25.599 | 24.8175 | 24.47 | 24.0355 | 23.283 | 21.9806 | 19.2095 | 15.5981 | 5.8616 | 5.8615 |

TABLE 13

PSNR comparisons of Pepper image with Gaussian impulse noise N(100, 1)

| peppers100 | 10% | 20% | 30% | 40% | 50% | 60% | 70% | 80% | 90% | 100% |
|---|---|---|---|---|---|---|---|---|---|---|
| Source Image | 18.8467 | 15.9063 | 14.1411 | 12.8516 | 11.9141 | 11.1092 | 10.449 | 9.8753 | 9.3765 | 8.9096 |
| Median Filtered | 29.9692 | 27.4294 | 24.7459 | 21.4318 | 18.5652 | 15.9527 | 13.8572 | 12.0724 | 10.6241 | 9.4218 |
| WFM Filtered | 26.9042 | 25.5832 | 24.4008 | 22.6971 | 21.1074 | 19.3773 | 17.5019 | 15.0496 | 12.134 | 8.8984 |
| Phase I Filtered | 23.4015 | 25.8742 | 24.5208 | 19.1361 | 21.1884 | 17.7941 | 17.1634 | 14.975 | 12.1224 | 9.006 |
| Phase II Filtered | 23.8909 | 25.7945 | 25.0586 | 19.9206 | 23.424 | 19.3033 | 19.4443 | 17.3239 | 12.8057 | 9.0033 |
| Phase III Filtered | 23.9702 | 25.4895 | 24.8713 | 20.0356 | 23.6294 | 19.6012 | 19.9193 | 18.3251 | 13.0996 | 9.0087 |

TABLE 14

PSNR comparisons of Pepper image with Gaussian impulse noise N(150, 1)

| peppers150 | 10% | 20% | 30% | 40% | 50% | 60% | 70% | 80% | 90% | 100% |
|---|---|---|---|---|---|---|---|---|---|---|
| Source Image | 16.4052 | 13.4467 | 11.7026 | 10.4573 | 9.5373 | 8.6574 | 8.0488 | 7.4204 | 6.9361 | 6.4753 |
| Median Filtered | 29.2107 | 26.436 | 22.9045 | 19.2664 | 16.2452 | 13.2435 | 11.3031 | 9.3243 | 7.9328 | 6.7163 |
| WFM Filtered | 27.0794 | 25.6282 | 23.5374 | 21.3469 | 19.2533 | 16.5162 | 14.6353 | 10.0183 | 8.5636 | 5.7853 |
| Phase I Filtered | 26.5692 | 18.8928 | 23.2143 | 16.72 | 19.2321 | 16.5 | 14.6248 | 11.76 | 8.8765 | 5.5682 |
| Phase II Filtered | 26.0215 | 19.3948 | 24.7735 | 18.0217 | 22.8881 | 20.3265 | 18.2562 | 14.0726 | 9.6571 | 5.5476 |
| Phase III Filtered | 25.6957 | 19.4358 | 24.6855 | 18.1838 | 23.4336 | 21.4864 | 19.6814 | 15.1268 | 10.0125 | 5.5484 |

TABLE 15

PSNR comparisons of Boat image with Gaussian impulse noise N(100, 1)

| boat100 | 10% | 20% | 30% | 40% | 50% | 60% | 70% | 80% | 90% | 100% |
|---|---|---|---|---|---|---|---|---|---|---|
| Source Image | 18.8728 | 15.9257 | 14.1406 | 12.8904 | 11.9609 | 11.157 | 10.4631 | 9.8986 | 9.3735 | 8.9204 |
| Median Filtered | 25.7855 | 24.5166 | 22.6761 | 20.421 | 18.1782 | 15.824 | 13.8263 | 12.1558 | 10.705 | 9.5395 |
| WFM Filtered | 23.9393 | 23.1395 | 22.1839 | 21.3294 | 17.4206 | 17.797 | 16.5751 | 14.6904 | 11.959 | 9.241 |
| Phase I Filtered | 23.9908 | 23.0586 | 22.3468 | 21.1481 | 19.8635 | 18.3781 | 16.6649 | 14.6015 | 12.0073 | 8.9421 |
| Phase II Filtered | 23.5103 | 22.862 | 22.5827 | 21.9376 | 21.2001 | 20.1183 | 18.5762 | 16.0646 | 12.506 | 8.8942 |
| Phase III Filtered | 23.0751 | 22.549 | 22.3184 | 21.7928 | 21.2139 | 20.3646 | 19.0255 | 16.6969 | 12.7024 | 8.8859 |

TABLE 16

PSNR comparisons of Boat image with Gaussian impulse noise N(150, 1)

| boat150 | 10% | 20% | 30% | 40% | 50% | 60% | 70% | 80% | 90% | 100% |
|---|---|---|---|---|---|---|---|---|---|---|
| Source Image | 16.4332 | 13.3897 | 11.7248 | 10.4619 | 9.4473 | 8.6796 | 8.0463 | 7.4545 | 6.911 | 6.4872 |

TABLE 16-continued

PSNR comparisons of Boat image with Gaussian impulse noise N(150, 1)

| boat150 | 10% | 20% | 30% | 40% | 50% | 60% | 70% | 80% | 90% | 100% |
|---|---|---|---|---|---|---|---|---|---|---|
| Median Filtered | 25.4982 | 23.6297 | 21.4382 | 18.6048 | 15.6958 | 13.2044 | 11.2 | 9.3842 | 7.8483 | 6.7937 |
| WFM Filtered | 14.2841 | 13.8169 | 21.5781 | 20.0284 | 18.1054 | 16.1864 | 14.0699 | 11.3531 | 8.3044 | 5.5106 |
| Phase I Filtered | 23.8346 | 21.6319 | 20.0325 | 18.6238 | 17.4079 | 16.3592 | 15.5501 | 13.8035 | 13.1138 | 11.6076 |
| Phase II Filtered | 23.4777 | 21.8587 | 20.2931 | 18.8529 | 17.6329 | 16.6175 | 15.8409 | 13.8028 | 13.2089 | 11.631 |
| Phase III Filtered | 23.0712 | 21.8202 | 20.3187 | 18.9254 | 17.6648 | 16.6313 | 15.8391 | 13.8028 | 13.1488 | 11.6363 |

The above tables contain data of two phases' filtering results. A further processing called the Phase III can be performed by applying the same Phase II operations over the image again. We see that AMFG is stable since repeating Phase II operations will not reduce the performance. From the tables, the performance of Phase I is close to those of WFM but after Phase II, the performance is 3 to 4 dB better than those of WFM. Even 5 dB better performances can be found when the impulse mean strength is over 200.

In summary, this invention adopts two-phase image filter. In the first phase, most noises are removed. For noise ratio higher than 30%, there would be corrupted spots (a small region of corrupted pixels) left. To make the filtering result be much more close to the original intact image, we perform thresholding over the filtered image of the first phase and utilize the thresholded image for corruption determination of pixels and for further filtering of noises as well. According to the experiments, AMFG filter evidently increase the SNR and PSNR performances. Moreover, in addition to filtering, at the same time we can perform image analyses such as thresholding, edge detection, and image segmentation. The total time and spatial complexity of computation is as following table and we can find that they are much lower than those of the state-of-art analysis algorithms.

TABLE 17

Spatial complexities of AMFG filter and proposed analyses operations.

| Phase I Filter | N = image border length; L = gray levels |
|---|---|
| Maximum memory usage | $N^2 + L$ |
| Total memory usage | $3N^2$ |
| Phase II Filter | N = image border length; n = sample window border length |
| Maximum memory usage | $N^2$ |
| Total memory usage | $3N^2$ |

TABLE 18

Time complexities of AMFG filter and proposed analyses operations.

| Phase I Filter | N = image border length; n = sample window border length; $c_n$ = the number of sections; $c_p$ = the average number of gray levels in a section; L = the total number of gray levels in the histogram and $L = c_n \times c_p$; $k_2$ = the number of fuzzy partitions (Thresholds). | |
|---|---|---|
| Assignments | $6(N^2 \times k_2 \times n^2) + 6(N^2 \times k_2) + 8(c_n + k_2) + 2(N^2 \times k_1) + 11N^2 + 3c_n + 764$ | $O(N^2 \times k_2 \times n^2 + L)$ |
| Additions | $5(N^2 \times k_2 \times n^2) + 2(N^2 \times k_1) + 2(N^2 \times k_2) + 2(4c_n + 3k_2) + N^2 + 3c_n - 4$ | $O(N^2 \times k_2 \times n^2 + L)$ |
| Multiplications | $(N^2 \times k_2 \times n^2) + (c_n \times c_p) + N^2 + c_n + 2$ | $O(N^2 \times k_2 \times n^2 + L)$ |
| Divisions | $2(N^2 \times k_2 \times n^2) + (N^2 \times k_2) + N^2 + 2c_n + 1$ | $O(N^2 \times k_2 \times n^2 + L)$ |
| Comparisons | $2(N^2 \times k_2 \times n^2) + 2(N^2 \times k_1) + 2N^2 + 3(c_n + c_p - 1) + k_2$ | $O(N^2 \times k_2 \times n^2 + L)$ |
| Floor operations | $c_n + 1$ | $O(c_n)$ |
| Total | | $O(N^2 \times k_2 \times n^2 + L)$ |
| Phase II Filter | N = image border length; n = sample window border length; | |
| Assignments | $[5(n^2 - 1) + 3](N - 2)^2$ | $O(n^2 \times N^2)$ |
| Comparisons | $(n^2 - 1)(N - 2)^2 + 2n(N - 2)^2$ (Median operations: $2(N - 2)^2$) | $O(n^2 \times N^2)$ |
| Increments | $(n^2 - 1)(N - 2)^2$ | $O(n^2 \times N^2)$ |
| Floor operations | $[2(n^2 - 1) + 2](N - 2)^2$ | $O(n^2 \times N^2)$ |
| Total | | $O(n^2 \times N^2)$ |

In the above complexity evaluation, finding thresholds in the histogram requires $10c_n+8k_2-4$ memory accesses, $L+15c_n+6k_2+3c_p-7$ additions, one division, 2 multiplications, and one floor operation. That is, the complexity of finding thresholds is of order O(L) which is much lower than state-of-art methods. With such a low cost as Tables 17 and 18, this invention effectively and efficiently performs image analyses such as thresholding, edge detection, and segmentation. This invention breaks through the dilemma that heavily corrupted images cannot be analyzed. Therefore, this invention can be widely applied in industries such as medical imaging, image compression, multimedia communications, space technology, . . . , etc. This invention possesses wide applicability and high industrial worth. Especially, the thresholded image TH in Phase I can also be replaced with result images from other thresholding algorithms and becomes the input of Phase II. This compatibility enlarges the application area. Therefore, this invention does achieve the objective and there is no other similar methods found in open area. This invention meets the required criteria to apply for the patent.

What is claimed is:

1. An analysis method comprising a Phase I and a Phase II image processing, wherein the phase I processing producing a histogram of a noisy image;

according to the histogram, automatically generating a fuzzy partitions represented by LR fuzzy sets and parameters of the fuzzy sets' membership functions; wherein the parameters are left spread $\alpha$, mean m, and right spread $\beta$ such that the fuzzy partitions are represented by LR fuzzy sets $(\alpha, m, \beta)_{LR}$;

with these automatically generated fuzzy sets and their membership functions, using fuzzy inference as noise filter and producing the Phase I filtered and thresholded images;

the Phase II processing scaning the resultant images of Phase I by sample windows and comparing the centered pixel with surrounding pixels in a sample window of the thresholded image to determine whether the center pixel is a part of a corrupted spot;

in a sample window, the non-corrupted pixels being used for filling the center pixel that is corrupted;

the Phase II analysis again applying the same thresholding algorithm in Phase I to obtained the Phase II thresholded image; wherein the Phase II thresholded image is used to perform the edge detection analysis.

2. The method as claimed in claim 1, wherein analyses of heavily corrupted images using fuzzy partitions as claimed in claim 1 comprises the steps of:

regarding the image as a N-by-N matrix, and calculating a histogram thereof;

cutting the histogram into several sections and summing up the statistics in every section;

if the summation of previous section is negative and present one is positive, determining that the starting gray level of present section being a coarse valley point;

between any two consecutive coarse valley points, finding out the gray level with the maximum statistic as a peak point and between any two peak points, finding out the gray level with the minimum statistic as an accurate valley point;

regarding a starting point and an end point of the histogram as two valley points; one peak point and two neighboring valley points forming a fuzzy partition; wherein the peak point is the mean m of the corresponding LR fuzzy set $(\alpha, m, \beta)_{LR}$; a distance from the left neighboring valley point to the peak point is the left spread parameter $\alpha$ while the distance from the right neighboring valley point to the peak point is the right spread parameter $\beta$;

for each of the fuzzy partition $(\alpha, m, \beta)_{LR}$, calculating membership grades of all the pixels in the sample window; using the membership grade as weighting, calculating the weighted average of each sample window; and calculating a maximum likelihood estimator of each sample window; choosing the weighted average that is the most close to the estimator as the output so as to obtain the filtered image of Phase I.

3. The method of claim 2, wherein the histogram's starting point is taken at gray level 5 and the end point is taken at the maximum gray level L minus 5, that is L−5. In this way most impulse noises will not attend the calculations of fuzzy partitions, filtering, and thresholding.

4. The method of claim 2, wherein the Phase I thresholded image is obtained by replacing all pixels' gray levels with their corresponding fuzzy partition's mean m.

5. The method of claim 2, wherein the membership grade of each pixel multiplying with each pixel's gray level is the weighted value; in each sample window, summing up all the weighted value to obtain the weighted sum; in a sample window, the weighted sum over the sum of membership grades is the weighted average.

6. The method of claim 2, wherein the weighted average that is the most close to the maximum likelihood estimator of the pixels in every sample window is selected to fill into a matrix until the scanning is end. When the scanning is end, the Phase I filtered image is obtained.

7. The method of claim 1, wherein the steps of Phase II are:

putting the thresholded image of Phase I in a N×N matrix TH(I, J);

horizontally scanning the pixels of TH(I, J) by a n×n sample window $x_d(I+i,J+j)$;

setting threshold value Kt for corruption determination and comparing the center pixel of the sample window with its surrounding pixels;

if there are fewer than Kt pixels having the same gray levels as the center pixel, the center pixel being regarded corrupted; otherwise, move the sample window to the next position and go back to (2);

calculating the median of the non-corrupted pixels in the sample window, which is different from the center pixel; replacing the center pixel's gray level with the median;

obtaining the Phase II filtered image after that each sample window is processed with the above procedure;

in this way, after two-phase filtering, the AMFG filter evidently increasing the SNR and PSNR values such that the image are clear.

8. The method of claim 7, wherein in the fourth step of the Phase II supposes that the threshold for corruption determination is Kt and the accumulated number of corrupted pixels is K; comparing the center pixel with its surrounding ones pixel by pixel in the sample window, increasing K if a neighbor pixel has the same gray level as the center one; otherwise, remaining the value of K; when K<Kt, the center pixel is regarded as part of a corrupted spot otherwise when K≧Kt, it is regarded as intact.

9. The method of claim 1, wherein the Phase II thresholded image is obtained by applying the thresholding method in claim 4 over the Phase II filtered image.

10. The method of claim 1, wherein the Phase II thresholded image is scanned using sample window and if the center pixel is different from one of the left, upper left, upper, and upper right pixel, the maximum gray level is put in the corresponding position of a matrix ED, otherwise 0 is put in that position; after every the pixels of the Phase II thresholded image is scanned and processed in this way, the edge-detected image ED is obtained where all the edges are white.

11. The method of claim 1, wherein the Phase II thresholded image is scanned using sample window and if the center pixel is different from one of the left, upper left, upper, and upper right pixel, 0 is put in the corresponding position of a matrix ED, otherwise the maximum gray level is put in that position; after every the pixels of the Phase II thresholded image is scanned and processed in this way, the edge-detected image ED is obtained where all the edges are black.

12. The method of claim 1, wherein the horizontal scanning of an image is from upper left to lower right, from upper right to lower left, from lower left to upper right, and from lower right to upper left.

13. The method of claim 1, wherein the horizontal scanning of an image is replaced with vertical scanning.

14. The method of claim 1, wherein the size of the sample windows is 3×3 and additionally the size is changed according to the situation of noise corruption; and the sample window size is 5×5, 7×7, 5×7, and 7×5 for filtering larger corrupted spot.

15. The method of claim 1, wherein a reference value v for cutting histogram into sections is determined according to Nyquist Rate sampling theorem so that the number of sections $c_n$ is calculated.

16. The method of claim 1, wherein the Phase I thresholded image TH is replaced with any other thresholded image by other thresholding methods and becomes input of Phase II for further filtering and analyses.

17. The method of claim 1, wherein the Phase II is applied more than once and thus called Phase III, Phase IV, . . . , etc; and the PSNR and SNR will not change obviously in these later phases.

* * * * *